United States Patent [19]

Gloge et al.

[11] 4,027,814

[45] June 7, 1977

[54] APPARATUS FOR BREAKING BRITTLE RODS OR FIBERS

[75] Inventors: Detlef Christoph Gloge, Red Bank; Peter William Smith, Colts Neck; Edwin LeRoy Chinnock, Rumson, all of N.J.

[73] Assignee: Bell Telephone Laboratories, Incorporated, Murray Hill, N.J.

[22] Filed: Oct. 24, 1975

[21] Appl. No.: 625,484

Related U.S. Application Data

[62] Division of Ser. No. 412,293, Nov. 2, 1973, Pat. No. 3,934,773.

[52] U.S. Cl. .............................. 225/104; 81/5.1 R; 81/420; 225/106
[51] Int. Cl.² ........................................ B26F 3/00
[58] Field of Search .......... 225/103, 104, 105, 106; 72/410, 389; 29/203 H, 203 HM, 203 D; 140/106; 81/5.1 RA, 418, 420, 425, 353

[56] References Cited

UNITED STATES PATENTS

| | | | |
|---|---|---|---|
| 188,262 | 3/1877 | Russell | 81/353 |
| 475,261 | 5/1892 | Winton | 140/106 |
| 1,309,354 | 7/1919 | Dallmeyer et al. | 225/96 |
| 2,212,599 | 8/1940 | Hall | 225/104 |
| 2,779,382 | 1/1957 | Anello | 72/389 |

*Primary Examiner*—Leon Gilden
*Attorney, Agent, or Firm*—Wilford L. Wisner; James F. Hollander

[57] ABSTRACT

Particular apparatuses implement a method of breaking a rod of brittle material, such as a glass optical fiber, so as to yield a mirrorlike surface across the entire rod end. A decreasing tensile stress is achieved across the cross section of the rod, which at all points is greater than zero but less than the threshold stress at which a mist zone forms, by simultaneously applying longitudinal tension to the rod and bending it in a tool that laterally moves a section of the fiber while holding sections to either side in friction-type clamps. A convenient hand tool for breaking optical fibers uses pivoting clamps which serve to increase tensile stress as bending is increased. Scoring is done before or after the above-mentioned tool operations.

9 Claims, 13 Drawing Figures

APPARATUS FOR BREAKING BRITTLE RODS OR FIBERS

CROSS REFERENCE TO RELATED APPLICATION

This application is a division of our copending application, Gloge-Smith-Chinnock Case 12-16-3, Ser. No. 412,293, now U.S. Pat. No. 3,934,773 filed Nov. 2, 1973, and assigned to the assignee hereof.

BACKGROUND OF THE INVENTION

This invention relates to apparatuses for breaking rods of brittle materials, such as glass optical fibers, in a way that reliably produces flat end surfaces that are perpendicular to the longitudinal axis of the fiber.

With installation and maintenance consuming an ever increasing share of system costs, simple and inexpensive splicing techniques become a prerequisite for economically competitive communication systems. One bottleneck encountered in splicing optical fiber cables is the fiber end preparation, as conventional grinding and polishing techniques turn out to be too time consuming and costly, especially when practiced in the field by service and maintenance personnel.

It is well known that glass fibers sometimes break with flat, perpendicular end faces if previously scored, and it has become common practice in the laboratory to obtain good ends in this way by a process of trial and error. Besides being inexpensive and simple, this technique has the added advantage of producing perfectly clean surfaces uncontaminated by lossy residues. However, for such a laboratory practice to become a useful technology, absolute control of the breaking process and the utmost reliability in obtaining successful results are required.

It is, accordingly, the broad object of the present invention to provide a reliable apparatus for breaking optical fibers for producing flat, perpendicular end surfaces. In particular, the apparatus is to implement the rod or fiber breaking method of our above-described patent application.

SUMMARY OF THE INVENTION

In accordance with the present invention, a clean, flat break is produced in optical fibers by controlling the stress distribution across the fiber in an appropriate bending and tensioning tool using particular types of friction clamps and a post that laterally translates an intermediate section of the fiber. In particular, a tensile stress is produced in the fiber which varies from a maximum value along the region of the fiber circumference that is scored, to a minimum non-zero value along the diametrically opposite region of the fiber circumference. In addition, the tensile stress at all points along the fiber cross section is less than the threshold stress for producing irregularities associated with what is called a "mist" zone.

Some species of the invention employ pivoting friction-type clamps that tend to increase the tension as bending progresses. These are typically used together with a flexible support member for the fiber. Alternatively, a support member with a fixed curved section in the intended scoring region is used.

It is an advantage of the present invention that the range of stress distributions within which perfectly flat and perpendicular end surfaces are obtained is sufficiently wide that it was found possible to construct a simple hand tool for this purpose with a pliers-like or paper-punch-like action.

These and other objects and advantages, the nature of the present invention, and its various features will appear more fully upon consideration of the various illustrative embodiments now to be described in detail in connection with the accompanying drawings.

DETAILED DESCRIPTION

Figure 1A:
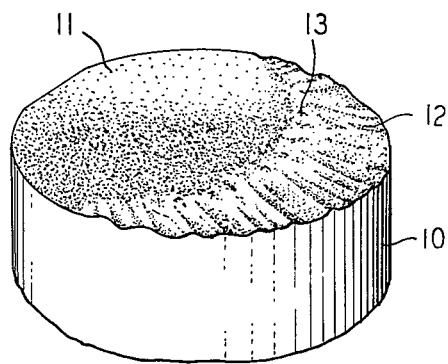
FIG. 1A shows the end of a rod that has been broken in such a manner as to produce a mirror zone, a mist zone and a hackle zone.

It is well known that when a glass rod is broken, it tends to break in such a way that the fracture face comprises three distinct regions which are known, respectively, as the mirror zone, the mist zone, and the hackle zone. As is illustrated in FIG. 1A, which shows an end surface of a glass rod 10, the mirror zone 11 is an optically smooth surface; the hackle zone 12 is an area wherein the fracture has forked and the end surface has separated into three or more pieces; and the mist zone 13 is a transition region between these two zones.

It has been experimentally demonstrated (see "On the Shape and Size of the Fracture Zones on Glass Fracture Surfaces" by J. W. Johnson and D. G. Holloway, published in *Philosophical Magazine* 14, pp. 731–743, 1966) that the distance $r$ from the origin of the fracture to a point on the boundary between the mirror zone and the mist zone is given by $$Z \sqrt{r} = K, \qquad (1)$$

where $Z$ is the local tensile stress at the point in question; and $K$ is a constant, characteristic of the given material.

Figure 1B:
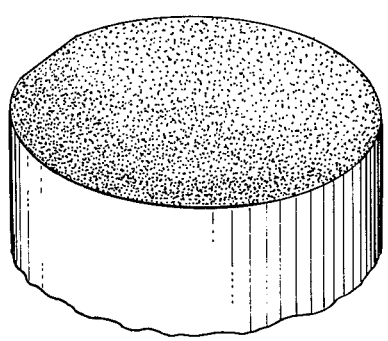
FIG. 1B shows the end of a rod that has been broken in such a manner as to produce a mirror zone across the entire end surface.

A theoretical justification for equation (1) is given by O. L. Anderson ("The Griffith Criterion for Glass Fractures" in *Fracture*, B. L. Averbach et al, Eds, New York, John Wiley and Sons, Inc., 1960). Basically, what happens is that as the crack propagates, more and more strain energy is converted into kinetic energy until the crack reaches a limiting velocity. At this point, the excess energy begins to be taken up by the creation of subsurface cracks, forming the mist zone. When the released strain energy is sufficient to create new surfaces, a hackle zone is created. Thus, in order to break a glass rod, such as an optical fiber, in such a way that the mirror zone extends across the entire end of the rod, as illustrated in FIG. 1B, it is necessary that the tensile stress at all points along the desired fracture surface be low enough so that $$Z \sqrt{r} < K. \qquad (2)$$

The initial value of Z, i.e., the value at the origin of the fracture, depends upon the size of imperfection from which the fracture originates. For purposes of producing a controlled fracture, the imperfection will be deliberately induced in a controlled manner.

Figure 1C:
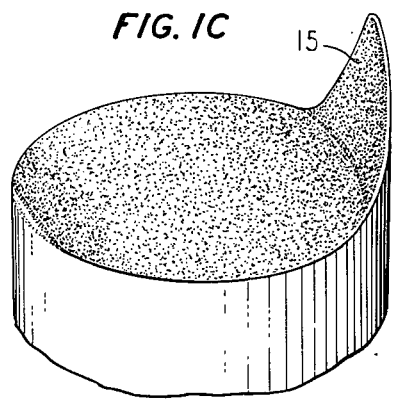
FIG. 1C shows the end of a rod that has been broken in such a manner as to produce a lip.

A second requirement is that Z not be allowed to become zero or negative (i.e., compressive stress) at any point across the rod or the crack will either cease to propagate, or propagate in a direction which is not perpendicular to the rod axis. Under this latter condition, a lip 15 is formed, as illustrated in FIG. 1C.

Thus, to produce a reliable, clean mirror zone fracture, in accordance with the present invention, the tensile stress distribution across the fiber must always be greater than zero, but less than the threshold value to produce a mist zone.

Figure 2A:
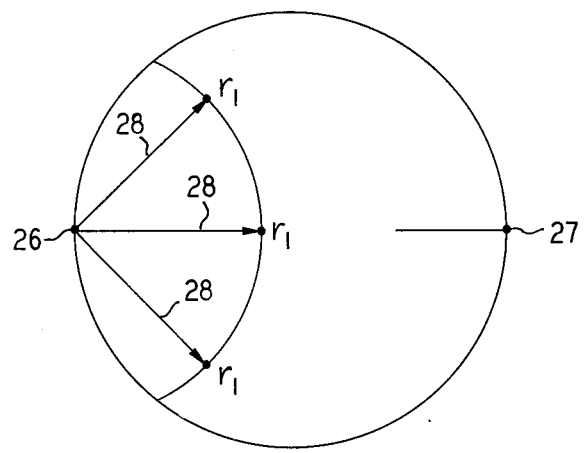
FIGS. 2A, 2B and 2C, included for purposes of explanation, shows a plot of the mist zone boundary curve and various stress distributions across a rod for producing the fractures illustrated in FIGS. 1A, 1B and 1C.

FIG. 2A shows the cross section of a rod 25 of diameter $d$. Let us assume, for purposes of explanation, that rod 25 is subjected to a uniform tensile stress $Z_1$ which initiates a fracture at point 26. The fracture will propagate away from point 26 in all directions, as indicated by arrows 28, in a plane perpendicular to the rod axis. At a distance $r_1$ less than $d$ for which equation (1) is satisfied, the fracture reaches the mist zone beyond which a clean, mirror zone fracture is no longer obtainable. It will be noted from FIG. 2A that when subjected to a uniform stress, the mist zone forms along an arc whose center is located at a distance $r_1$ from the fracture origin 26.

Figure 2B:
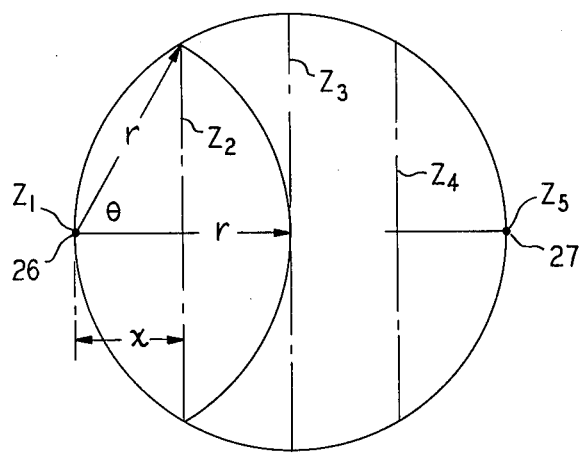

FIG. 2B shows the case in which the stress distribution across the rod is not uniform. More specifically, the stress distribution may now be described by a series of uniform stress lines $Z_1, Z_2 \ldots Z_5$, where $Z_1$, at the fracture origin 26, is a maximum, and $Z_5$, at point 27 diametrically opposite point 26, is a minimum, and wherein the intermediate stress values are related by $$Z_1 > Z_2 > Z_3 > Z_4 > Z_5. \qquad (3)$$

It will be noted that in the case of a nonuniform stress distribution of the type described, the stress at any particular distance $r$ from the fracture origin is a function of the direction in which $r$ is measured. For example, for the particular direction $\theta$ illustrated in FIG. 2B, the stress at distance $r$ is $Z_2$ whereas the stress at the same distance $r$ along the diameter is $Z_3$. From equation (3) we know that $Z_2 > Z_3$ and, hence, the product $Z \sqrt{r}$ is correspondingly less along the diameter than it is at the same distance for all other fracture directions. In particular, the product $Z \sqrt{r}$ is a maximum in the direction illustrated in FIG. 2B for which $r$ just touches the circumference of the rod. It is, therefore, at the circumference that the mist zone first develops.

In order to take this fact into account, it is convenient to express the critical distance $r$ in terms of the projection $$x = r \cos \theta = r^2/d \qquad (4)$$

along the diameter. Making this substitution, equation (1) is now given by $$Z(dx)^{1/4} = K, \qquad (5)$$

where the distance parameter (i.e., $x$) is, in all cases, the distance from the fracture origin measured along the diameter.

Figure 2C:
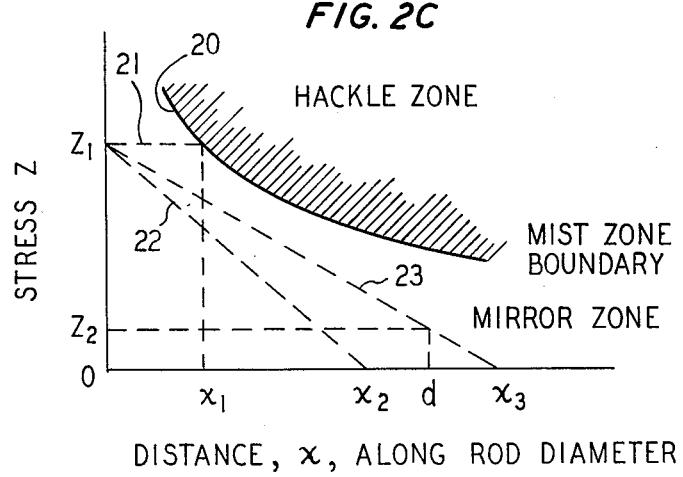

FIG. 2C included for purposes of explanation, shows a curve 20 representative of equation (5), wherein stress Z is the ordinate and the distance $x$ from the fracture origin is the abscissa. In particular curve 20 represents the boundary between the desirable stresses, represented by the clear area of the plot, which produce a mirror surface, and undesirable stresses represented by the cross-hatched region, which produce mist or hackle areas.

It is apparent from FIG. 2C that in order to obtain a mirror zone fracture across the entire rod surface, the stress must decrease as a function of distance from point 26 if the mist zone boundary is to be avoided. If, however, the stress decreases too rapidly, as indicated by dashed line 22, it will equal zero at a distance $x_2 < d$ and become negative (compressive) beyond $x_2$. As indicated hereinabove, this will produce a lip which is equally undesirable. Thus, the limits between which the stress can vary and still produce a mirror zone across the entire face of the rod are clearly defined. The stress must decrease such that it is always positive but less than the threshold stress defined by the mist zone boundary curve. One such stress variation curve is given by dashed line 23 which decreases from a maximum stress $Z_1$ at $x = 0$, to a minimum $Z_2$ at $x = d$, and at all times is less than $K(dx)^{-1/4}$. Clearly, there are an infinite number of such stress variation curves. In practice, however, there is a limited range of curves which are set by the realizable range of fracture stresses. These, as will be explained hereinbelow are a function of the thickness of the fiber cladding.

As is known, a typical optical fiber comprises an inner core region surrounded by an outer cladding of somewhat lower refractive index. In general, the useful optical wave energy is confined within the core region with the cladding serving primarily as a protective jacket.

Figure 3:
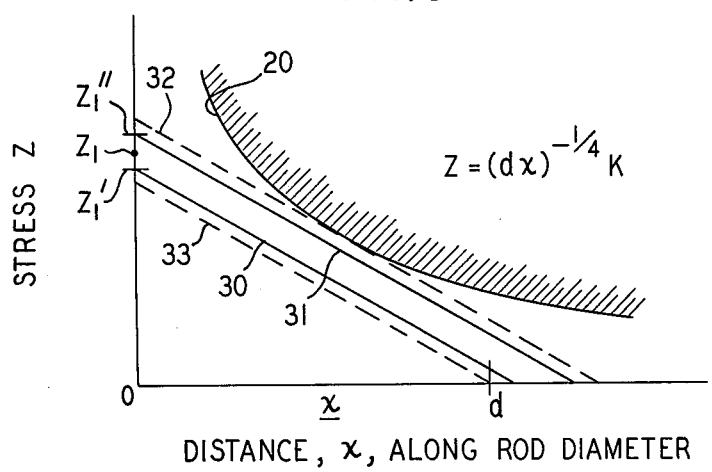
FIG. 3, included for purposes of explanation, shows a range of stress distributions for producing a mirror zone fracture.

To obtain a break at a prescribed point along the fiber, a controlled imperfection is produced at said point by scoring the fiber. Since the breaking stress varies inversely as the depths of the scoring, a deep score is advantageously made. However, inasmuch as it would be undesirable to score the core region, the maximum depth is, therefore, fixed by the thickness of the cladding. To provide an additional margin of safety, the actual depth of the scoring is made less than the cladding thickness. In general, the breaking stress will fall within a range which, as illustrated in FIG. 3, lies between a minimum value of $Z_1'$, for the deepest score, and a maximum value of $Z_1''$, for the shallowest score.

Figure 4:
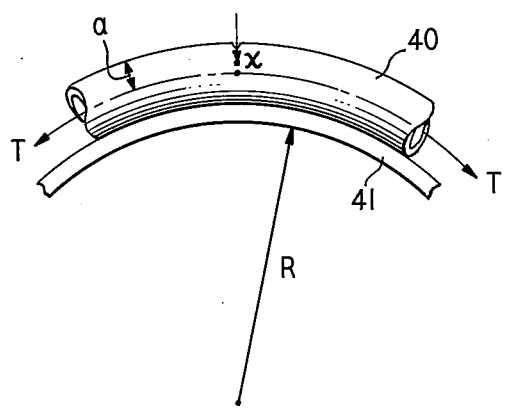
FIG. 4 shows a length of optical fiber and a bending form of fixed radius of curvature for producing a nonuniform stress distribution in said fiber.

For the case where the desired stress distribution is obtained by applying a constant average tensile stress and bending the fiber to a specified radius of curvature, as illustrated in FIG. 4, the stress distribution $Z(x)$ across the fiber is given by $$Z(x) = T + [E(a-x)/R] \qquad (6)$$

where

R is the radius of curvature of the form 41 over which the fiber 40 is bent;

T is the average tension applied longitudinally to the fiber;

E is Young's modulus; and $a$ is the radius of the fiber.

It will be noted from equation (6) that, for given values of T and R, the tensile stress is greatest at $x = 0$, and decreases linearly as a function of $x$. This is indicated by the two curves 30 and 31 in FIG. 3. So long as the upper curve 31, originating at the large breaking stress value $Z_1''$ remains less than the mist boundary curve 20, a mirror zone fracture is obtained. The lower curve 30, originating at the lower value breaking stress $Z_1'$ will produce a mirror zone fracture so long as the value of $x$ for which $Z(x) = 0$ is greater than the diameter $d$ of the fiber. The region between curves 30 and 31 is indicative of a practical range over which mirror zone fractures can be realized for given values of T and R. The maximum possible range over which a mirror zone fracture can be realized is included between dashed curve 32, which is just tangent to the mist zone curve 20, and dashed curve 33, for which the stress at $x = d$ is zero. However, it is preferable not to operate along either of these boundary curves as the slightest deviation therefrom can cause a hackle zone fracture or a lip.

Thus, to produce a mirror zone fracture in an optical fiber in accordance with one embodiment of the present invention involves three steps including: (a) scoring the fiber; (b) applying a tensile stress to the fiber; and (c) bending the fiber. It will be noted that the order in which the steps are followed is immaterial. That is, the fiber can be stressed and bent first, and scored last. Alternatively, steps (b) and (c) can be done simultaneously before or after scoring.

Figure 5:
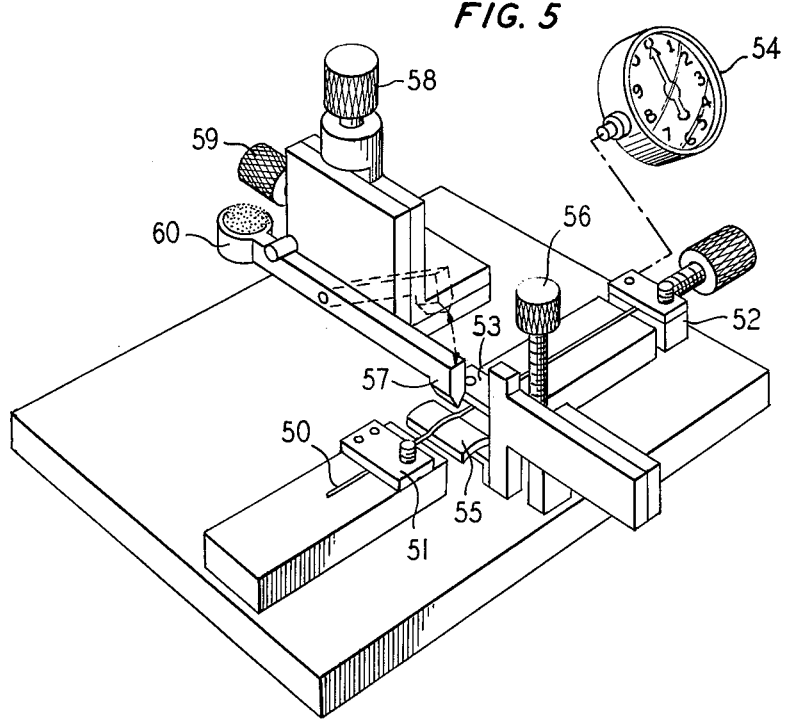
FIG. 5 shows, in greater detail, apparatus for breaking optical fibers by applying constant uniform tensile stress and constant radius bending.

FIG. 5 shows one embodiment of a device for breaking optical fibers using constant uniform tensile stress and constant radius of curvature bending. In this arrangement, the fiber 50 to be broken is clamped in place by means of a fixed clamp 51 and a movable clamp 52. A teflon-coated fiber guide 53 holds the fiber in position while permitting free longitudinal movement. The average tension applied to the fiber is indicated on a tension gauge 54 which measures the mechanical displacement of clamp 52.

A teflon-coated form 55, of fixed radius R, is raised under the fiber by means of a screw adjustment 56 and imparts a fixed curvature to the fiber. The fiber is scored by lowering a scoring blade 57 onto the fiber by means of an adjustment screw 58. The pressure the blade exerts upon the fiber is controlled by changing the weights in the counterbalance 60.

As can be seen, the three steps for breaking the fiber can be taken in any sequence. For example, the radius form can be raised, the fiber scored and then tension applied in the indicated order. Or, alternatively, the fiber can be scored first, the tension then applied, and the radius form raised as the final step.

Figure 6:
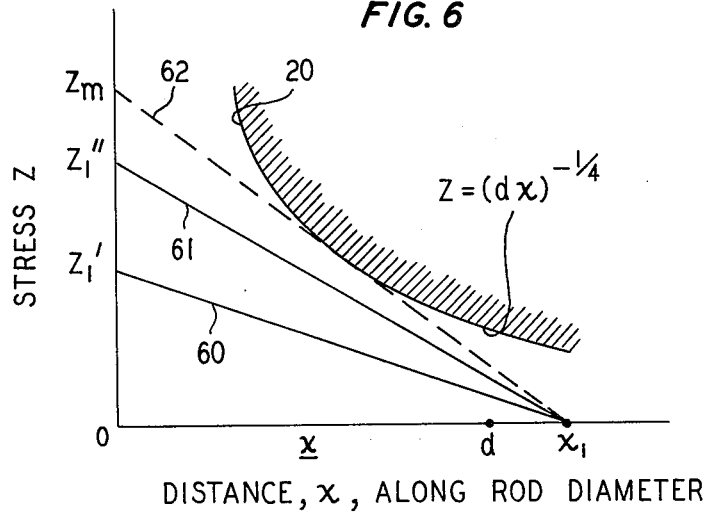
FIG. 6 shows graphically the stress distribution in a fiber in accordance with a second mode of operation.

FIG. 6, now to be considered, shows a somewhat different mode of operation from that described hereinabove. In the instant case a zero stress point is established at a point $x_1$ greater than the diameter $d$ of the fiber. The average tension and radius of curvature are then increased until the stress at the scoring exceeds the necessary breaking stress. The stress distribution at that instant is then given by curves such as 60 and 61 in FIG. 6. More particularly, curve 60 corresponds to the minimum breaking stress $Z_1'$ which, as explained hereinabove, is limited by the thickness of the fiber cladding. Curve 61 corresponds to a larger breaking stress $Z_1''$, obtained for a scoring depth that is somewhat less than that corresponding to the full cladding thickness. A practical operating range over which full mirror zone fractures are obtained would lie within the region included between curves 60 and 61. The maximum operating range is included between curve 60 and dashed curve 62 which is just tangent to the mist zone curve 20. However, one preferably would not operate along a boundary curve such as curve 62.

Figure 7A:
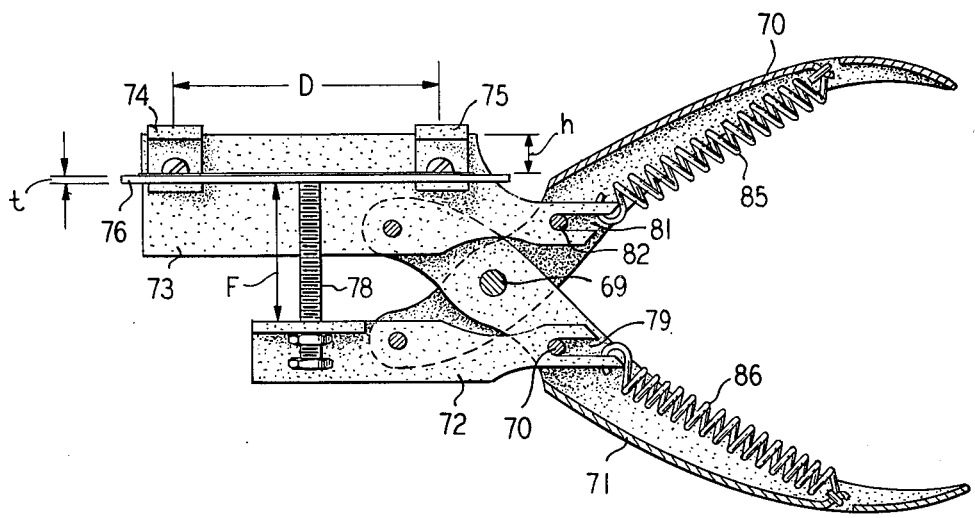
FIGS. 7A, 7B and 7C show details of a hand tool for breaking optical fibers in accordance with said second mode of operation.
Figure 7B:
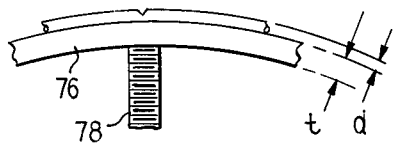
Figure 7C:
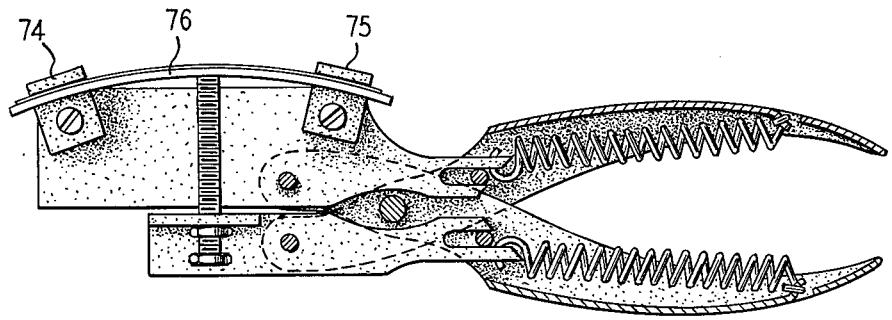

FIGS. 7A and 7C show two views of a convenient hand tool for breaking an optical fiber in accordance with the second mode of operation described in connection with FIG. 6.

Referring to FIG. 7A, the hand tool comprises two handles 70 and 71 arranged in a plierslike configuration so as to pivot relative to each other about an axis 69. A first support bracket 72, on which there is located an adjustable post 78, is mounted pivotally at a point along its length at the operating end of handle 70. The end of bracket 72 opposite post 78 is provided with a slot 79 which engages a pin 80 mounted on handle 71.

A second support bracket 73 is similarly mounted pivotally along its length to the operating end of handle 71. The near end of bracket 73 is provided with a slot 81 which engages a pin 82 mounted on handle 70. A pair of springs 85 and 86 are connected between the slotted ends of brackets 73 and 72 and points along the gripping portions of handles 70 and 71, respectively.

A pair of L-shaped fiber holding clamps 74 and 75 are mounted on opposite ends of bracket 73. Each clamp is free to rotate about a center which is located a distance $h$ below that portion of the clamp that extends in a direction perpendicular to the bracket surface. The center-to-center distance of the two clamps is D.

A fiber support member 76, of thickness $t$ is also provided.

When using the instant tool, the fiber to be broken is preferably scored first and then laid along support member 76 with the scored portion away from member 76, as shown in FIG. 7B. Member 76 is then placed between post 78 and clamps 74 and 75 with the fiber on the side adjacent to the clamp. The handles are then squeezed, causing post 78 to exert an upward force on the lower surface of member 76, and the clamps to exert an opposing force on the upper surface of member 76. This causes support member 76, and the fiber thereon, to bend as illustrated in FIG. 7C. Since the clamps 74 and 75 are free to pivot, they tend to conform to the curvature of member 76. In addition, the clamp surfaces in contact with the fiber are suitably coated with a material such as, for example, teflon, so that the fiber can slide relative to the clamp as member 76 is bent by the post. (Alternatively, the clamping surface can be located in the plane of the clamp pivot, i.e., $h = 0$, in which case there would be no relative movement between the fiber and the clamp, and no particular surface treatment would be necessary.) The surface of member 76, on the other hand, is not treated in this manner so that there is no significant relative motion between the fiber and the support member. Thus, the fiber and support member 76 can be considered to be one composite member made up of two dissimilar materials. However, because the moment of inertia of the support member is so much larger than that of the fiber, for all practical purposes the stress distribution is defined primarily by the support member. In particular, we are concerned with the zero stress region which falls approximately along the center of member 76, i.e., at a distance $t/2$ from the fiber. With regard to FIG. 6, the zero stress point $r_1$ is therefore, equal to $t/2 + d$ in this case. The fiber will break so long as the stress curve intersects the stress axis at a stress which is equal to or greater than the breaking stress required by the particular scoring. If the fiber does not break, either the scoring depth can be increased so as to reduce the required breaking stress or, alternatively, the stress curve can be varied by any one or any combination of changes in the tool including changing the thickness $t$ of the support member; changing the height F of post 78; or changing the distance D between clamps. However, once the combination scoring depth and tool parameters to produce a mirror zone fracture are determined, for a specific type of optical fiber, reproducible results are readily obtained.

Thus, in all cases it is understood that the above-described arrangements are illustrative of but two of the many possible specific embodiments which can represent applications of the principles of the invention. Numerous and varied other arrangements can readily be devised in accordance with these principles by those skilled in the art without departing from the spirit and scope of the invention.

What is claimed is:

1. Apparatus for breaking a rod of brittle material by bending and tensioning appropriate for use with scoring, comprising:
    means for placing said rod under tensile stress and bending said rod within an intermediate section between separate sections of said rod, said means for placing and bending comprising
    friction-producing clamps for holding said separate sections of said rod;
    a member disposed under said rod to support it and adapted to have a curved surface in contact with said intermediate section of said rod under conditions of bending, and
    means for translating said supporting member normal to the axis of said rod,
    the supporting member being sufficiently flexible to impart a varying radius of curvature to said rod when said member is translated, the rod and the supporting member acting as one composite member,
    whereby said support member is able to define both a radius of curvature and an always positive stress distribution for said rod in said intermediate section.

2. Apparatus according to claim 1 in which said translating means is a post for contacting said supporting member under the intermediate section of said rod under conditions of bending.

3. Apparatus according to claim 1 including means for scoring the rod.

4. Apparatus according to claim 1 in which the friction-producing clamps are rotatable clamps pivoted about points offset with respect to said rod opposite to the direction of translation and tending to rotate in a sense to apply tension to the rod.

5. Apparatus according to claim 4 in which the clamps have friction-producing surfaces for contacting the rod, said surfaces having coefficients of friction higher than that of the flexible supporting member.

6. Apparatus according to claim 4 additionally including a pair of mutually pivoted handles, comprising:
    one pair of adjacent ends of said handles adapted for gripping,
    an opposite pair of adjacent ends of said handles adapted for supporting respective brackets, and
    said first and second brackets supported on said latter ends so as to maintain a constant relative orientation with respect to one another during pivoting of the handles;
    the rotatable clamps being supported by a first one of said brackets,
    the translation means being a post being supported by the other of said brackets, and
    said supporting member being supported by a selected one of said two brackets.

7. A hand tool for breaking a rod of brittle material comprising:
    first and second handles arranged in a plierslike configuration so as to pivot relative to each other about a principal tool axis;
    one pair of adjacent ends of said handles being adapted for gripping;
    a post being mounted at a selected point at the other end of said first handle;
    a pair of spaced, L-shaped rod holding clamps being mounted pivotally at separate points near the other end of said second handle respectively on opposite sides of the post for holding a rod-supporting member against the upward thrust of said post when said handles are squeezed together;
    said rod-supporting member being bendable when said handles are squeezed together and such that there is essentially no relative motion between said rod and said support member when said rod is held by said support member and said L-shaped clamps facilitating the breaking thereof.

8. Apparatus for breaking brittle material in the form of a rod having an axis, said apparatus having means for producing a score on said rod, means for holding said rod on either side of said score, and causing a fracture to propagate from said score characterized in that
    said apparatus is specifically adapted for breaking a fibrous, relatively bendable rod of said material in that
    said holding means comprises a first clamp having surfaces for clamping said fibrous rod in place at one point and a second clamp having surfaces for clamping said fibrous rod in place at a second point, said second clamp being adjustably movable along the direction of the axis of said fibrous rod thereby adjustably applying tension to said fibrous rod;
    and said apparatus further comprises a form having a surface having a radius of curvature adjustably movable and located relative to said holding means so that a portion of said fibrous rod between said clamps assumes said radius of curvature when taut, said second clamp and said form being sufficiently adjustable so that an always-positive stress distribution is produceable in said fibrous rod,
    whereby said fibrous rod is able to be broken with a substantially perfect mirror zone fracture.

9. Apparatus as claimed in claim 8 wherein said surface of said form has a constant radius of curvature.

* * * * *